(12) United States Patent
Palmer

(10) Patent No.: US 8,142,318 B2
(45) Date of Patent: Mar. 27, 2012

(54) APPARATUS, SYSTEM, AND METHOD FOR A VARIABLE RATIO TRANSMISSION

(76) Inventor: Denis L. Palmer, Brigham City, UT (US)

( * ) Notice: Subject to any disclaimer, the term of this patent is extended or adjusted under 35 U.S.C. 154(b) by 384 days.

(21) Appl. No.: 12/191,260

(22) Filed: Aug. 13, 2008

(65) Prior Publication Data
US 2010/0041504 A1 Feb. 18, 2010

(51) Int. Cl.
*F16H 3/72* (2006.01)
*H02K 3/04* (2006.01)
*H02K 7/10* (2006.01)

(52) U.S. Cl. .............. 475/5; 475/331; 310/208; 310/83

(58) Field of Classification Search ................. None
See application file for complete search history.

(56) References Cited

U.S. PATENT DOCUMENTS

| | | | |
|---|---|---|---|
| 3,441,761 A | 4/1969 | Painton et al. | |
| 3,679,953 A | 7/1972 | Bedford | |
| 4,322,666 A | 3/1982 | Muller | |
| 4,340,833 A | 7/1982 | Sudo et al. | |
| 4,358,693 A * | 11/1982 | Palmer et al. | 310/46 |
| 4,520,300 A * | 5/1985 | Fradella | 318/603 |
| 4,634,958 A | 1/1987 | Corwall | |
| 4,883,981 A | 11/1989 | Gerfast | |
| 5,514,923 A | 5/1996 | Gossler et al. | |
| 5,558,589 A | 9/1996 | Schmidt | |
| 5,744,895 A | 4/1998 | Seguchi et al. | |
| 5,783,894 A | 7/1998 | Wither | |
| 5,851,162 A * | 12/1998 | Tether | 475/150 |
| 5,949,613 A | 9/1999 | Moir et al. | |
| 5,955,807 A | 9/1999 | Kajiura et al. | |
| 6,011,339 A | 1/2000 | Kawakami | |
| 6,053,833 A | 4/2000 | Masaki | |
| 6,067,801 A | 5/2000 | Harada et al. | |
| 6,090,005 A | 7/2000 | Schmidt et al. | |

(Continued)

FOREIGN PATENT DOCUMENTS

CN 87206678 6/1988

(Continued)

OTHER PUBLICATIONS

Electric Motor, Wikipedia, the free encyclopedia, http://en.wikipedia.org/wiki/Electric_motor, Jun. 24, 2008.

(Continued)

*Primary Examiner* — Justin Holmes
*Assistant Examiner* — Jacob S Scott
(74) *Attorney, Agent, or Firm* — Kunzler Needham Massey & Thorpe

(57) ABSTRACT

An apparatus, system, and method are disclosed to adjust input to output ratios with a planetary gear system. The apparatus comprises a sun gear that receives rotational force from a first input. A plurality of planet gears encircle the sun gear and operably connect with the sun gear. A planet gear carrier connects to the planet gears and transfers rotational energy to an output. A ring gear encircles the planet gears. The ring gear is a stator of an electric motor and rotational motion of the stator is a second input. The ring gear contains permanent magnets that align with the coils of the stator. The interaction of the permanent magnets and the coils provide the second input which adjusts rotational input to output torque and speed ratios.

27 Claims, 13 Drawing Sheets

U.S. PATENT DOCUMENTS

| | | |
|---|---|---|
| 6,110,066 A | 8/2000 | Nedungadi et al. |
| 6,155,364 A | 12/2000 | Nagano et al. |
| 6,371,878 B1 | 4/2002 | Bowen |
| 6,555,944 B1 | 4/2003 | York |
| 6,590,312 B1 | 7/2003 | Seguchi et al. |
| 6,600,244 B2 | 7/2003 | Okazaki et al. |
| 6,849,020 B2 | 2/2005 | Sumi |
| 6,948,461 B1 | 9/2005 | Kotwicki |
| 7,000,717 B2 | 2/2006 | Ai et al. |
| 7,126,309 B1 | 10/2006 | Takeuchi et al. |
| 7,719,147 B2 | 5/2010 | Palmer et al. |
| 2005/0045392 A1 | 3/2005 | Maslov et al. |
| 2006/0244320 A1 | 11/2006 | Guo et al. |
| 2006/0279166 A1* | 12/2006 | Takeuchi ............... 310/268 |
| 2007/0052314 A1 | 3/2007 | Hsu |
| 2007/0129198 A1* | 6/2007 | Atarashi ............... 475/5 |
| 2007/0181357 A1 | 8/2007 | Saito et al. |
| 2008/0024044 A1 | 1/2008 | Palmer et al. |
| 2008/0096711 A1 | 4/2008 | Smith et al. |
| 2008/0119314 A1* | 5/2008 | Usoro ............... 475/5 |
| 2008/0167156 A1 | 7/2008 | Lin et al. |
| 2008/0182698 A1 | 7/2008 | Matsubara et al. |
| 2009/0247341 A1* | 10/2009 | Abe et al. ............... 475/5 |

FOREIGN PATENT DOCUMENTS

| | | |
|---|---|---|
| CN | 1073306 | 6/1993 |
| EP | 1314884 | 5/2003 |
| EP | 1870990 | 12/2007 |
| GB | 2433967 | 7/2007 |
| WO | 9718617 | 5/1997 |
| WO | 2005073599 | 8/2005 |
| WO | 2007140624 | 12/2007 |
| WO | 2008007125 | 1/2008 |

OTHER PUBLICATIONS

Continuously variable transmission, Wikipedia, the free enclyclopedia, http://en.wikipedia. org/wiki/Continuously_variable_transmission, Jun. 24, 2008.

Power split, http://en.wikipedia.org/wiki/Transmission_%28mechanicsc%29#Infinately_variable.

2004 Toyota Prius Road Test, The Family Car Web Magazine, Nov. 11, 2008, http://www.familycar.com/roadtests/ToyotaPrius/.

The clean green car company, Toyota Prius Transmission, http://www.cleangreencar.co.nz/p./prius-transmission, Jun. 19, 2008.

Toyota Prius—Power Split Device, http://www.eahart.com/prius/psd/, Jun. 16, 2008.

Transmission (mechanics), http://en.wikipedia.org/wiki/Transmission_%28mechanics%29, Jun. 24, 2008.

Uncommon types, http://en.wikipedia.org/wiki/Transmission_(mechanics), Jun. 16, 2008.

Power split, http://en.wikipedia.org/wikifTransmission_%28mechanics%29#Infinately_variable.

The clean green car company, Toyota Prius Transmission, http://www.cleangreencar.co.nz/page/prius-transmission, Jun. 19, 2008.

Transmission (mechanics), http://en.wikipedia.org/wiki/Transmission_%28mechanics%29, Jun. 24, 2008.

Hanselman, D., "Brushless Permanent Magnet Motor Design", McGraw-Hill, 1994, pp. 1-39, 61-101, 103-123, 125-153 and 155-181.

European Search Report, App. No. EP09807315, Received Sep. 23, 2011.

The Power Split Device, http://prius.ecrostech.com/original/Understanding/PowerSplitDevice.htm, Retrieved Oct. 7,2011.

International Search Report, PCT/US2009/053771, Sep. 30, 2009.

* cited by examiner

APPARATUS, SYSTEM, AND METHOD FOR A VARIABLE RATIO TRANSMISSION

FIELD OF THE INVENTION

This invention relates to transmissions and more particularly relates to a variable ratio transmission incorporating two inputs where one input is an electric motor.

BACKGROUND

Description of the Related Art

Electric vehicles offer hope for reduction of dependence on fossil fuels. However, electric vehicles have thus far been unpopular due to the limited range and time required to recharge batteries. One of the major obstacles to increasing electrical vehicle performance is efficiency of electric motors used to drive electric vehicles. While an electric motor may be smaller than a gas or diesel engine, larger batteries are required that at least in part replace the weight of an engine. Also, heavy and inefficient transmissions lose some of the power produced by electric motors.

The transmission is typically the most complicated mechanical component in a vehicle. The many complicated moving parts wear over time. As a result, transmissions require constant maintenance and are very expensive to replace when broken. They are also one of the heaviest and largest parts of a typical vehicle. What is needed is a transmission for a vehicle that is much smaller and lighter than currently available transmissions that allows for variable ratios through the use of very efficient electric motors.

SUMMARY

From the foregoing discussion, it should be apparent that a need exists for an apparatus, system, and method that adjust rotational input to output ratios with a planetary gear system. Beneficially, such an apparatus, system, and method would incorporate a transmission with an electric motor. The present invention has been developed in response to the present state of the art, and in particular, in response to the problems and needs in the art that have not yet been fully solved by currently available transmissions or electric motors. Accordingly, the present invention has been developed to provide an apparatus, system, and method for adjusting rotational input to output ratios with a planetary gear system that overcome many or all of the above-discussed shortcomings in the art.

The apparatus to adjust rotational input to output ratios with a planetary gear system is provided with a plurality of components configured to functionally execute the necessary steps of adjusting rotational input to output ratios. These components in the described embodiments include a sun gear that receives rotational force from a first input. A plurality of planet gears encircle the sun gear and operably connect with the sun gear. The sun gear transfers rotational force to the planet gears. Each of the planet gears connects with a planet gear carrier. The planet gears transfer rotational energy to the planet gear carrier and the planet gear carrier transfers rotational force to an output.

The apparatus includes a ring gear that encircles the planet gears and operably connects to each of the planet gears. The ring gear includes or is connected to a rotor of an electric motor. The rotational motion of the ring gear is a second input. The second input controls speed and torque ratios between the first input and the output. The ring gear contains a plurality of permanent magnets. A stator of the electric motor includes coils aligned with the permanent magnets of the ring gear. Each coil is positioned between pairs of permanent magnets of the ring gear. The stator is fixed in position with respect to the ring gear. The second input includes electrically controlling the speed of the ring gear using the stator.

The apparatus, in one embodiment, is configured such that the stator comprises a non-magnetic, non-conductive material and the coils of the stator are embedded within the non-magnetic, non-conductive material. In one embodiment, at least a portion of the ring gear surrounding the permanent magnets also comprises a non-metallic, non-conductive material.

The apparatus is further configured, in one embodiment, such that the coils of a row of coils are each positioned the same radius from the center of the sun gear. The permanent magnets of a corresponding row of permanent magnets are each positioned a substantially similar radius from the center of the sun gear. As such, the center of the permanent magnets substantially aligns with the center of the corresponding coils. In a further embodiment, the apparatus may be configured such that the permanent magnets are positioned such that when a coil aligns with a permanent magnet a next coil aligns between two magnets. In one embodiment, each coil is of a uniform size with a non-conductive, non-magnetic core and a thin conductive shield surrounding the core. A conductor is also wound around a shield of the coil. The radius of the core of the coils is substantially the same as the radius of the permanent magnets.

In a further embodiment, the apparatus may be configured such that each coil is wound so that a conductor enters the coil at the exterior of windings of the coil and exits at the exterior of the coil without the conductor passing the windings of the coil perpendicular to the windings. Each coil is constructed of two halves wherein each half is wound such that the conductor starts at an interior of the coil and is wound with increasing radius such that the end of the conductor exits at the perimeter of the coil. Each half of the coil is joined such that the start of each conductor located at the interior of the winding are electrically connected together.

In another embodiment, the permanent magnets are shaped as cylinders with an end of the cylindrical permanent magnet positioned toward the stator. In a further embodiment, the torque and speed of the planet gear carrier are proportionally related to each other such that a decrease in speed corresponds to an increase in torque. In one embodiment, the stator comprises a plurality of groups of co-planar coils. In the embodiment, a group of co-planar coils includes a plurality of coils in a two-dimensional plane and each group of co-planar coils is parallel to one or more additional groups of co-planar coils. Each group of co-planar coils is positioned between a pair of groups of co-planar permanent magnets. A group of co-planar permanent magnets includes a plurality of permanent magnets in a two-dimensional plane. The groups of co-planar permanent magnets are parallel to each other and to the planes of the co-planer coils.

In a further embodiment, the teeth of the sun, planet, planet carrier and ring gears and the electric motor remain constantly engaged. In one embodiment, the stator consists of a fixed position with regard to the ring gear and surrounds the outside perimeter of the ring gear. In a further embodiment, the apparatus may be configured to contain a one-way clutch operably connected with the ring gear. The one-way clutch allows the ring gear to rotate in one direction. The apparatus may also contain two shunt rings and a sequence control. The two shunt rings are typically made of a magnetically conductive material and connect to an exterior edge of each permanent magnet that is not facing a stator. The sequence control connects each coil such that current flows in a coil in one direction and the sequence control disconnects the coil and reconnects the coil with current flowing in the opposite direction in response to a set of permanent magnets aligning directly with the coil.

In a further embodiment, one or more additional planetary gear systems may be connected in series in a sequence. The first planetary gear system includes said sun gear, said plurality of planet gears, said planet gear carrier, said ring gear and said stator. Each additional planetary gear system includes a sun gear, planet gears, a planet gear carrier, a ring gear and a stator. In each additional planetary gear system electrically controlling the speed of each ring gear using each associated stator makes up a second input to each additional planetary gear system. The sun gear of the first planetary gear system receives a first input and transfers rotational energy to the output. Each planet gear carrier of each planetary gear system ahead of the final planetary gear system transfers rotational energy to the sun gear of the next planetary gear system.

A system of the present invention is also presented to adjust rotational input to output ratios with a planetary gear system. The system may be embodied as a sun gear that receives a rotational force from a first input. The sun gear operably connects with a plurality of planet gears that encircle the sun gear. The sun gear transfers rotational force to the plurality of planet gears. The planet gears connect to a planet gear carrier. The planet gears transfer rotational energy to the planet gear carrier which transfers rotational force to an output. The planet gears are operably connected to a ring gear that encircles the planet gears. The ring gear includes a rotor of an electric motor. The rotational motion of the ring gear makes up a second input. The second input controls speed and torque ratios between the first input and the output. The ring gear includes a plurality of permanent magnets.

A stator interacts with the ring gear and includes a plurality of coils aligned with the permanent magnets of the ring gear. Each coil is positioned between pairs of permanent magnets of the ring gear. The stator is fixed in position with respect to the ring gear. Electrically controlling the speed of the ring gear using the stator makes up the second input.

The system may further include rotational force from a fossil fuel engine as the first input. The sun gear is mechanically linked to the fossil fuel engine and the sun gear receives rotational force from the fossil fuel engine. In another embodiment, the system includes rotational force from a second electric motor as the first input. In the embodiment, the sun gear is mechanically linked to an output of the second electric motor and the sun gear receives rotational force from the output of the second electric motor. In one embodiment, the second electric motor is powered by a battery. The battery may be charged by a fossil fuel engine. The output of the second electric motor may be directly or indirectly connected with the sun gear. The system may further include a system of gears to which the first input is connected before being connected with the sun gear. In one embodiment, the output includes a propulsion system for a vehicle.

A method of the present invention is also presented to adjust rotational input to output ratios with a planetary gear system. The method in the disclosed embodiments substantially includes the steps necessary to carry out the functions presented above with respect to the operation of the described apparatus and system. In one embodiment, the method includes receiving rotational force from a first input to a sun gear. Rotational force is then transferred from the sun gear to a plurality of planet gears. The plurality of planet gears encircles the sun gear and operably connects with the sun gear.

The method includes transferring rotational energy from the plurality of planet gears to a planet gear carrier. The planet gear carrier connects to the plurality of planet gears. The planet gear carrier transfers rotational energy to an output. The method includes transferring rotational energy from each of the planet gears to a ring gear. The ring gear encircles the planet gears and operably connects to each of the planet gears. The ring gear includes a rotor of an electric motor. The rotational motion of the ring gear makes up a second input. The second input controls speed and torque ratios between the first input and the output. The ring gear includes a plurality of permanent magnets.

The method includes providing an electrical input to a stator of the electric motor. The stator includes a plurality of coils aligned with the permanent magnets of the ring gear. Each coil is positioned between pairs of permanent magnets of the ring gear. The stator is fixed in position with respect to the ring gear. Electrically controlling the speed of the ring gear using the electrical input to the stator makes up the second input.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of engine types, connection configurations, gear configurations, user selections, computer hardware, hardware circuits, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
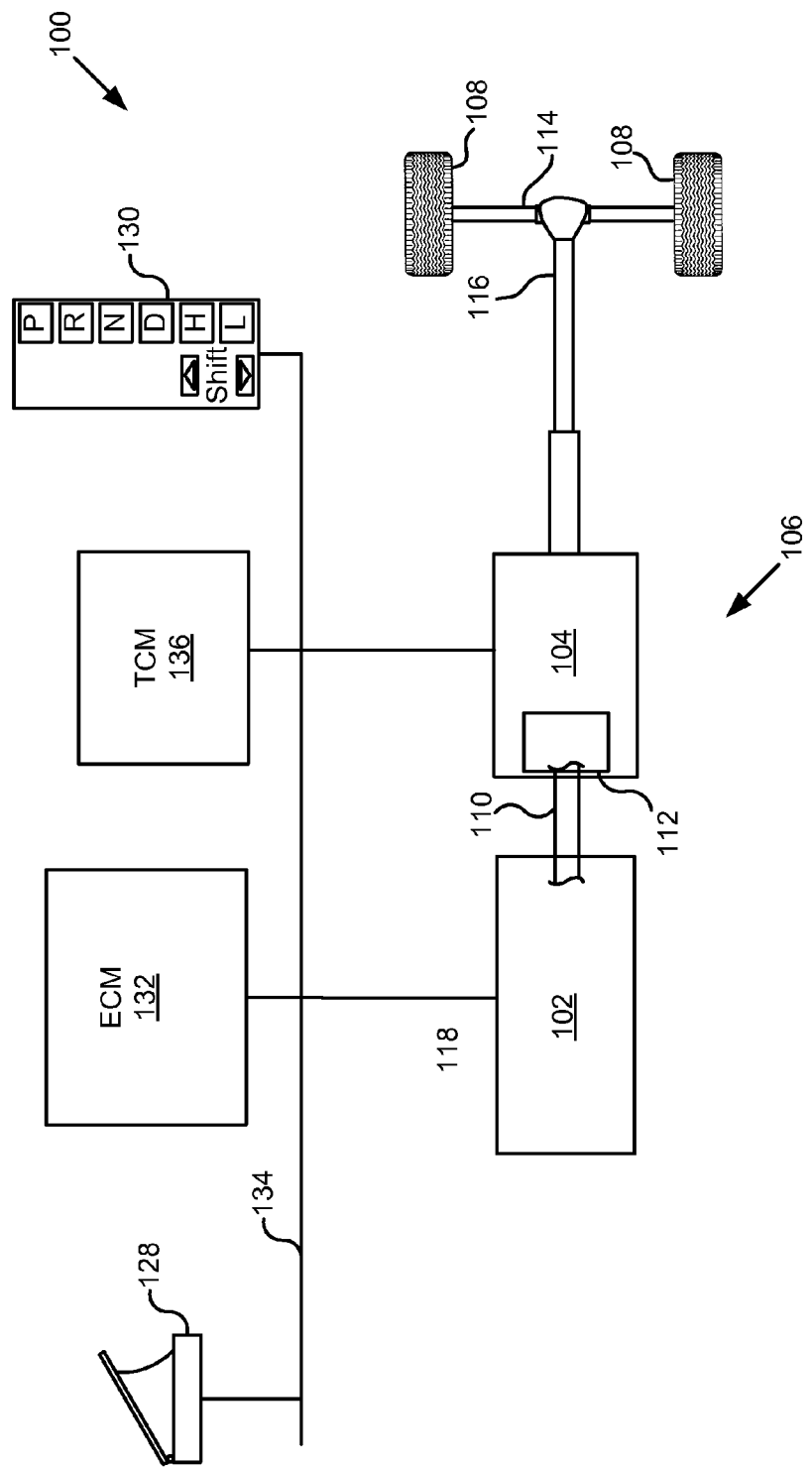
FIG. 1 is a block diagram illustrating one embodiment of a vehicle in accordance with the prior art.

FIG. 1 is a schematic block diagram illustrating one embodiment of a vehicle in accordance with the prior art. The system comprises a vehicle 100. The vehicle 100 may be an automobile, truck, bus, or other type of internal combustion powered vehicle. The vehicle 100 may comprise an internal combustion engine 102 coupled to a transmission 104. The internal combustion engine 102 [hereinafter "engine 102"] may be of the four stroke diesel-fueled type with Compression Ignition (CI). Alternatively, the engine 102 may be a different type of engine such as, but not limited to, two stroke diesel-fueled types, a Spark Ignition (SI) type of engine, or a gaseous or gasoline fueled type. The engine 102 together with the transmission 104 is commonly referred to as a "drivetrain."

In one embodiment, the drivetrain further comprises a pair of rotating propulsion members in the form of ground engaging wheels 108. An output shaft 110 of the engine 102 couples the engine 102 to a torque converter 112 of the transmission 104. The transmission 104 may comprise a manual or automatic transmission. A propeller shaft 114 is rotatably coupled to a drive shaft 116 of the transmission 104 and transfers torque from the engine 102 to the wheels 108 in order to propel the vehicle 100. The present description of the drivetrain is directed to the primary components of the drivetrain with standard components not being specifically described as the standard components would be known to those skilled in the art.

A driver utilizes a throttle 128, a gear selection module 130, and a plurality of input devices (not shown), such as a steering wheel, while driving the vehicle 100. In one embodiment, an engine control module ("ECM") 132 is configured to receive control data from the plurality of input devices, throttle 128, and gear selection module 130. The ECM 132 may also be configured to interpret the data and send command signals to the engine 102. One skilled in the art will recognize that the ECM 132 is also capable of commanding a plurality of systems, such as a fueling system.

In one embodiment, the ECM 132 is configured to communicate over a data network 134 with a transmission control module (TCM) 136. The data network 134 may be a common data path over which the throttle 128 and gear selection module 130 transmit commands. Additionally, the data network 134 may comprise wired or wireless connections between the plurality of devices 128, 130, 132, and 136. Alternatively, each device 128, 130, 132, 136 may include a separate connection to each of the other devices.

The vehicle 100 of FIG. 1 is given as an example of a vehicle that utilizes a transmission 104 in order to propel a vehicle. The transmission 104 is typically a system of gears that transmits mechanical power from the engine 102 to the wheels 108. A typical transmission is very complex and requires maintenance to insure that the intricate parts function properly. In addition to the costs associated with upkeep and maintenance, a typical transmission is very large and heavy which decreases the overall efficiency of the vehicle 100.

Figure 2A:
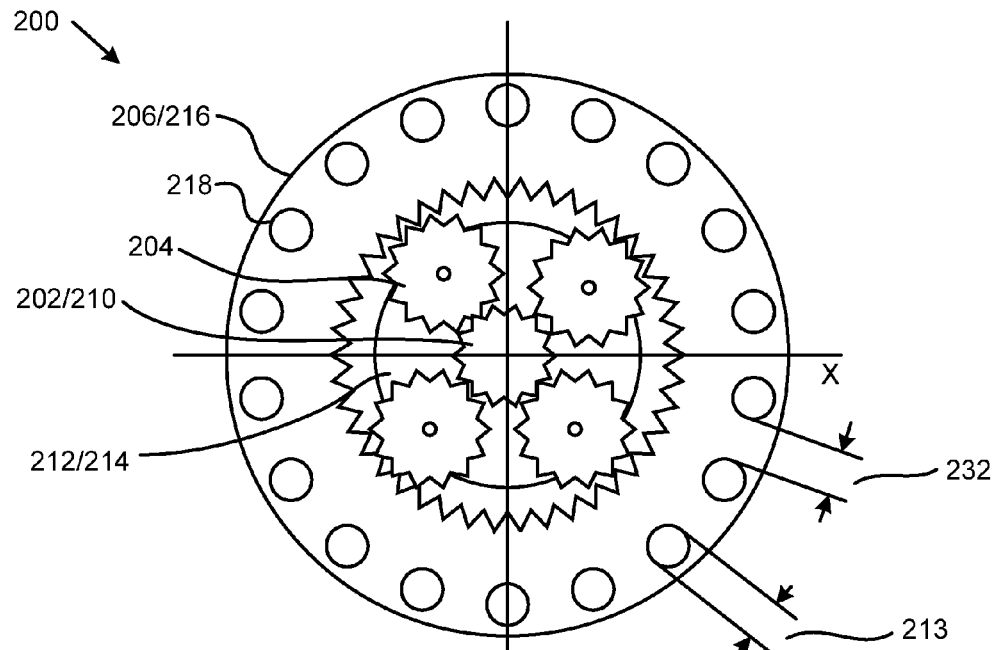
FIGS. 2A and 2B are side views of one side of a sun gear, four planet gears, a ring gear and a stator illustrating one embodiment of a variable ratio transmission in accordance with the present invention.
Figure 2B:
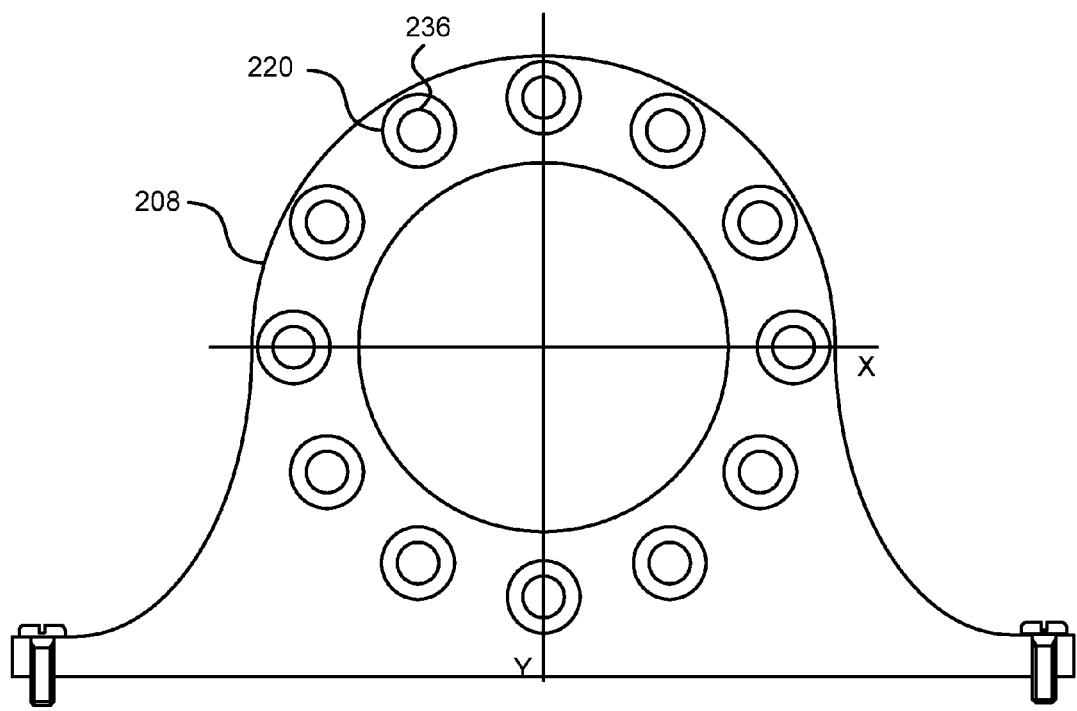

FIGS. 2A and 2B are side views of one side of one embodiment of a variable ratio transmission apparatus 200 in accordance with the present invention. The variable ratio transmission apparatus 200 includes a sun gear 202, four planet gears 204, a ring gear 206 and a stator 208. The sun gear 202 receives a rotational force from a first input 210. The rotational force of the first input 210 can be generated from a gas engine, an electric motor, a hydrogen motor, a hydroelectric motor, a jet engine, or any device that can produce a rotational force.

The plurality of planet gears 204 encircle the sun gear 202 and operably connect with the sun gear 202. The plurality of planet gears 204 operably connect with the sun gear 202 in that the teeth of the planet gears 204 interact with the teeth of the sun gear 202 by successively engaging teeth. Rotational force is transferred from the sun gear 202 to the planet gears 204 as force is transferred from the individual gear teeth of the sun gear 202 to the individual gear teeth of the planet gears 204.

In one embodiment, the teeth of the sun gear 202 remain constantly engaged with the teeth of the planet gears 204. In this embodiment, a clutch-type mechanism is not utilized to disengage the teeth of the gears. The teeth of the planet gears 204 also remain constantly engaged with the teeth of the ring gear 206.

The planet gear carrier 212 is connected to the plurality of planet gears 204. The planet gear carrier 212 is movably connected with the center of each of the planet gears 204 such that the planet gears 204 can rotate around their centers while attached to the planet gear carrier 212. When the variable ratio transmission apparatus 200 is in use, the planet gears 204 rotate around their centers and in a circular pattern defined by the planet gear carrier 212. The planet gear carrier 212 rotates around its center and receives rotational energy from the planet gears 204. The planet gear carrier 212 also transfers rotational energy to an output 214. The output 214 of the planet gear carrier 212 may be connected with a propulsion system of a vehicle, a generator, or any other mechanism that receives rotational force.

A ring gear 206 encircles the planet gears 204. The teeth of the ring gear 206 interact with the teeth of each of the planet gears 204. The ring gear 206 also acts as the ring gear 206 of an electric motor. The electric motor supplies rotational force to the planet gears 204 through the motion of the ring gear 206. The rotational motion of the ring gear 206 comprises a second input 216.

The ring gear 206 includes permanent magnets 218 located around the perimeter of the ring gear 206. In one embodiment, the permanent magnets 218 are cylindrical and are aligned so that the axis of the cylinder is parallel with the rotational axis of the ring gear 206. In one embodiment, at least a portion of the ring gear 206 surrounding the permanent magnets 218 is made of a non-metallic, non-conductive material. In one embodiment, the entire ring gear 206 is made of a non-metallic, non-conductive material.

The stator 208 is positioned such that coils 220 positioned in the stator 208 align with the permanent magnets 218 of the ring gear 206. The stator 208 is connected to a fixture such that the stator 208 does not move with respect to the ring gear 206. The stator 208 may be fixed to the body of a vehicle, to the floor of a building or any other fixture that fixes the stator 208 with respect to the ring gear 206.

Figure 3:
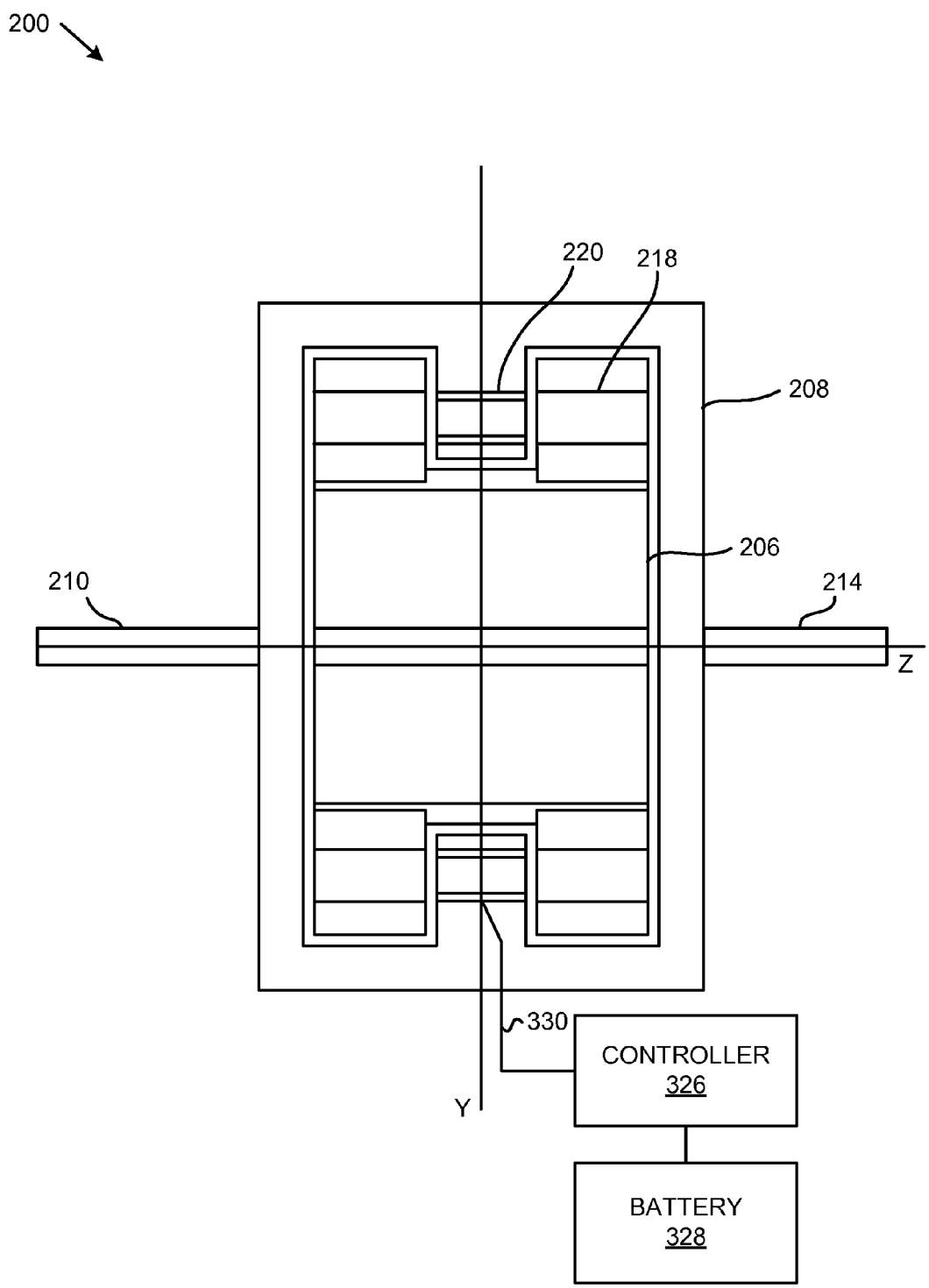
FIG. 3 is a cutaway front view further illustrating the variable ratio transmission of FIGS. 2A and 2B in accordance with the present invention.

The stator 208 includes coils 220 situated around the perimeter of the stator 208 such that when the stator 208 and ring gear 206 are aligned, the center of the coils 220 coincide with the permanent magnets 218. While other configurations are possible, aligning the permanent magnets 218 and coils 220 in this way increases efficiency of the variable ratio transmission. As is shown in FIGS. 2 and 3, each coil 220 is positioned between pairs of permanent magnets 218 of the ring gear 206.

In one embodiment, the stator 208 is made of a non-magnetic, non-conductive material wherein the coils 220 are embedded within the non-magnetic, non-conductive material. As is shown in FIGS. 2A and 2B, the coils 220 of a row of coils 220 are each positioned a same radius from the center of the sun gear 202. The permanent magnets 218 of a corresponding row of permanent magnets 218 are each positioned a substantially similar radius from the center of the sun gear 202 such that the center of the permanent magnets 218 substantially aligns with the center of the corresponding coils 220.

In other embodiments, a plurality of rows of permanent magnets 218 is included in the ring gear 206 and a corresponding plurality of rows of coils 220 is included in the stator 208.

In one embodiment, the torque and speed of the planet gear carrier 212 are proportionally related to each other such that a decrease in speed corresponds to an increase in torque. Alternately, an increase in speed corresponds to a decrease in torque.

FIG. 3 is a cutaway front view illustrating one embodiment of the variable ratio transmission apparatus 200 of FIGS. 2A and 2B in accordance with the present invention. The coil 220 of the stator 208 is sandwiched between two groups of permanent magnets 218 of the ring gear 206. In the embodiment of FIG. 3, the stator 208 encases the ring gear 206. In other embodiments, the stator 208 surrounds the outside perimeter of the ring gear 206 but does not completely encase the ring gear 206.

The first input 210 engages the sun gear 202 through one side of the variable ratio transmission apparatus 200 and the planet gear carrier 212 connects with the output 214 on the opposite side of the variable ratio transmission apparatus 200. The ring gear 206 rotates in the x-y plane, as do the first input 210 and output 214. The fixed position of the stator 208 allows it to receive electrical input through input wires 330. In one embodiment, the input wires 330 receive energy from a battery 328 through a controller 326. An input signal is received from a controller 326. Electrical power is received from a battery 328.

In one embodiment, the variable ratio transmission apparatus 200 weighs much less than a traditional transmission and is much smaller than a traditional transmission. Because the teeth of each gear remain constantly engaged, there is no need for a clutch mechanism to disengage the gear teeth. Many other parts of a traditional transmission are also not necessary which allows the variable ratio transmission apparatus 200 to be much lighter and smaller than traditional transmissions.

Figure 4:
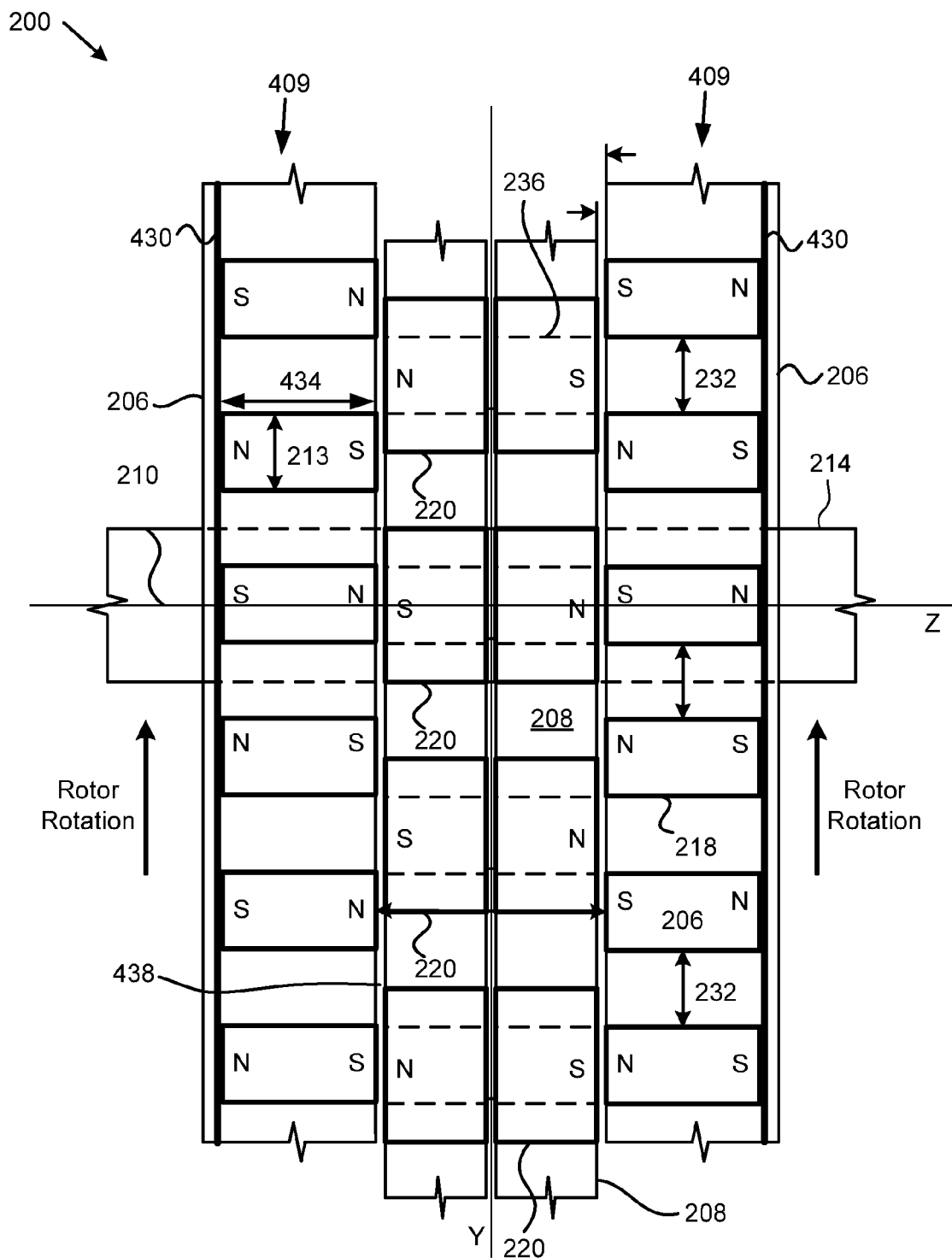
FIG. 4 is a cutaway, phantom front view of the variable ratio transmission of FIGS. 2A and 2B in accordance with the present invention.

FIG. 4 depicts a cutaway, phantom front view of the variable ratio transmission apparatus 200 of FIGS. 2A and 2B in accordance with the present invention. FIG. 4 depicts two groups of permanent magnets 409 with a stator 208 sandwiched between the groups of permanent magnets 409. Note that the stator 208 is depicted in two parts. In a preferred embodiment, splitting the stator 208 in two parts allows the coils 220 to be constructed in two parts. One half of a coil 220 is wound so that a wire starts in a center and is then wound like a bobbin with the wire exiting on the outside perimeter of the coil 220. The other half of the coil is wound in a similar way such that the two wires in the center can be connected when the two halves of the stator 208 are put together. The center wires may be constructed by soldering, using a connector, or any other means to make electrical contact between the wires. In another embodiment, a coil 220 is constructed as a one piece assembly with a wire placed in the center and then both halves of the coil are wound simultaneously.

By constructing a coil 220 in this way, the center wire need not exit alongside the coil. Having a coil 220 where the center wire exits alongside the coil 220 causes a flux leak that reduces efficiency. Testing has shown that a coil 220 as depicted constructed so there is no wire running from the center alongside the wires of the coil 220 results in a about a 10% increase in motor torque from the same amount of power input. One of skill in the art will recognize other ways to wind a coil 220 so the wires 330 to connect the coil 220 exit the coil 220 at the outside perimeter of the coil 220.

FIGS. 2 and 4 depict more permanent magnets 218 than coils 220. The coils 220 are intentionally spaced so that when one coil 220 is aligned with a pair of permanent magnets 218, the next coil 220 is between two other sets of permanent magnets 218. This arrangement is advantageous because when a coil 220 is aligned with a set of permanent magnets 218 such that little or no rotational torque is developed, the next coil 220 is positioned to generate rotational torque.

This concept can be seen by viewing the coils 220 and permanent magnets 218 in FIGS. 2A and 2B. A set of permanent magnets 218, for convenience of reference, includes two permanent magnets 218 opposite each other. In the depicted embodiment, there are six sets of permanent magnets 218 shown running from the top of the page to the bottom. There are also four coils 220 running from top to bottom. (Of course the other coils 220 and magnets of the stator 208 and ring gear 206 are included but are outside of the view shown in FIG. 4.) The first input 210 is shown entering one end of the variable ratio transmission apparatus 200 and the output 214 is shown exiting the opposite end of the variable ratio transmission apparatus 200.

In the depicted example, each set of permanent magnets 218 is paired with another set of adjacent permanent magnets 218 and connected with a portion of the shunt ring 430. A shunt ring 430 connects with the exterior edge of the permanent magnet 218 that is not facing the stator 208. The shunt ring 430 is typically constructed of a magnetically conductive material. The permanent magnets 218 are arranged by polarity so that one set of permanent magnets has a north-south field across the stator 208 while the next set has an opposite south-north field across the stator 208. Two sets of permanent magnets 218 connected with a portion of the shunt ring 430 from a magnetic loop where flux is tightly contained in the permanent magnets 218, shunt ring 430 and across the gap between the ring gear 206 and the stator 208. Any two sets of adjacent permanent magnets 218 form a magnetic loop.

The spacing 232 of the magnets 218 with respect to the diameter 213 of the permanent magnets 218 is critical in terms of directing magnetic flux efficiently and creating a matrix of magnets 218 and resulting flux that is even. In the depicted embodiment, the spacing 232 between magnets 218 is equal to the diameter 213 of a magnet 218. This creates a matrix that is ladder-type for a configuration of two ring gears 206 and one stator 208. If the spacing 232 between magnets 218 is less, current limiting in the coil 220 is reduced. If the spacing 232 between magnets 218 is increased, motor torque is reduced. Experimentation has shown that a spacing 232 of about one diameter 213 of a magnet 218 is optimal.

In addition, the length 434 of the magnets 218 is typically longer than the spacing 232 between magnets 218. Shortening the length 434 of the magnets 218 beyond about a point where the length 434 equals the diameter 213 allows flux of a magnet 218 to go from one end of the magnet 218 to the other end of the magnet 218 rather than traveling through the shunt ring 430 and forming a magnetic loop. Using a non-magnetic material in the ring gear 206 between magnets 218 also helps to direct flux around the magnetic loop rather than going from one end of a magnet 218 to the other.

Like current, magnetic flux travels a path of least resistance. In the depicted embodiment, magnetic flux created by this pattern of magnets 218 forms a very evenly distributed matrix with flux substantially contained by the magnets 218 and through the stator 208 between the magnets 218. By constructing the stator 208 and ring gear 206 of non-magnetic, non-conductive material for portions in the area of interest, other than the coils 220, magnets 218, and shunt rings 430, the variable ratio transmission apparatus 200 can be made to be efficient because the magnetic fields are not causing significant losses through eddy currents in the motor housing. The variable ratio transmission apparatus 200 is efficient and does not generate a significant amount of heat so conductive housings are not required for heat transfer.

Spacing 232 between magnets 218 is also chosen for efficiency. If the magnets 218 are too far apart, the path of least resistance for the magnets 218 is from one magnet 218 to an adjacent magnet 218 rather than across the gap between permanent magnets 218. Experimentation has shown that an efficient distance between magnets 218 on either side of the stator 208 is about 1.5 times the length of the magnets 218. For 1 inch long magnets 218, a preferable spacing 232 is 1.5 inches. A spacing 232 of more than about 2 times the length of the magnet 218 begins to degrade efficiency very quickly. If the magnets 218 are spaced much further apart, a significant amount of flux will go from one magnet 218 to the adjacent magnet 218 instead of to the opposing magnet 218. If spacing 232 is much less, the coils 220 must become very narrow and the interaction between the coils 220 and magnets 218 will be less efficient.

In the situation depicted in FIG. 4, the first coil 220 (top) has current flowing such that a magnetic field is set up through the core 236 where north is to the left and south is to the right. The first set of magnets 218 (top) are set up so the north of the magnet 218 on the left side is next to the coil 220. The opposite magnet 218 on the left of the coil 220 has a south pole that is facing the coil 220. The polarity of the next set of magnets 218 (the two magnets just below the top set) is opposite the top set of magnets 218. The first coil 220 will be repelled from the first set of magnets 218 and attracted to the second set of magnets 218.

The second coil 220 from the top has current flowing in an opposite direction so the magnetic field created has a north to the right and south to the left. This will cause the second set of magnets 218 to be repelled and the third set to be attracted. This pattern continues for the remaining coils 220 and magnets 218. The magnetic forces created cause the ring gear 206 to rotate as shown.

When the ring gear 206 rotates so the first coil 220 is centered between the second set of magnets 218, it will no longer generate rotational torque because moving the ring gear 206 in either direction causes magnetic forces to move the magnets 218 back to the center. For the depicted example, the spacing of the coils 220 and magnets 218 is such that every other coil 220 will reach a center of a set of magnets 218 at the same time and the intervening coils 220 will be directly between two sets of magnets 218. At this point, for efficient motor operation current is reversed in the coils 220 that are centered between magnets 218. This reverses the north and south poles of the generated magnetic field such that the coils 220 centered between magnets repel those magnets 218 and are attracted to the next set of magnets 218 in the rotation. This sequence continues and the coils 220 that were between magnets 218 previously eventually reach a position where they are centered between a set of magnets and the current in those coils 220 is reversed.

The air gap 438 between stator 208 and ring gear 206 is also chosen for efficiency. The air gap 438 is preferably about 1/10 of an inch or less. Larger air gaps 438 reduce efficiency and smaller air gaps 438 are more difficult to maintain, but if achieved, can increase efficiency.

Figure 5:
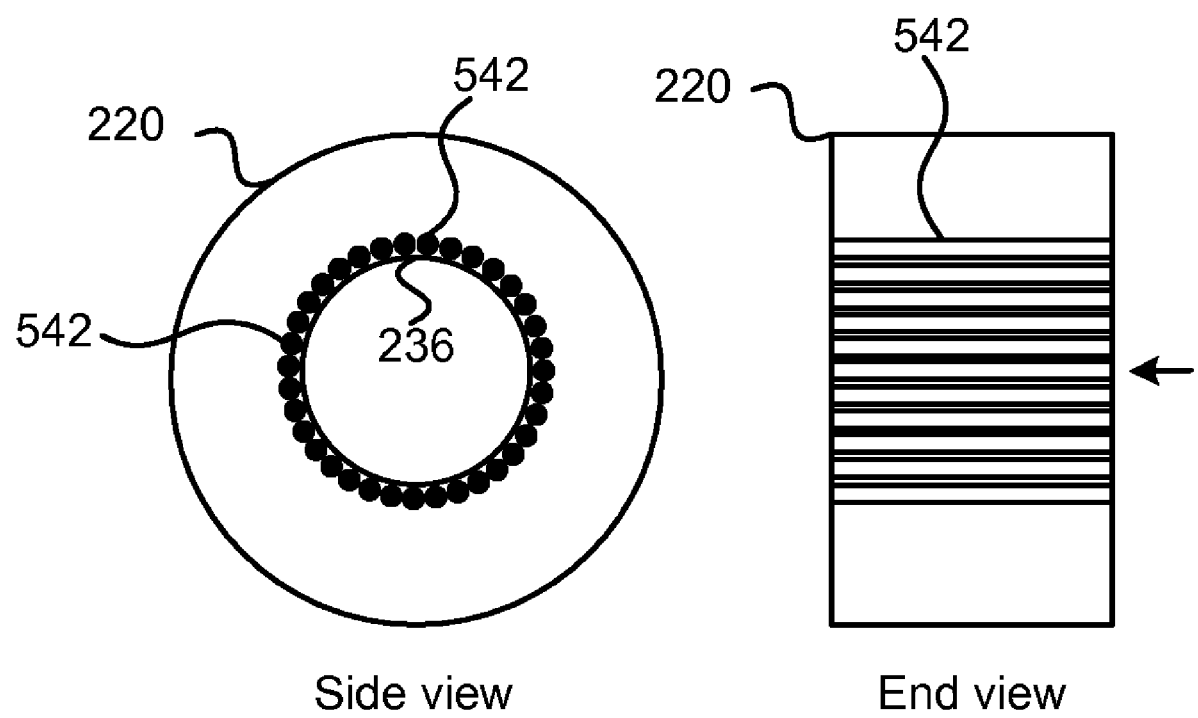
FIG. 5 is a cutaway view of a coil in accordance with the present invention.

FIG. 5 illustrates one embodiment of a coil 220 including a side view and end view. The side view is illustrated from a direction along an axis of the coil and the end view is illustrated from a direction substantially perpendicular to the axis of the coil. Each coil 220 includes the core 236. In a preferred embodiment, the center of each core 236 is an air core surrounded by a conductive path around the circumference of the core 236. In one embodiment, the core 236 is a hollow tube, preferably of a non-conductive material, surrounded by conductors 542 that run the width of the coil 220. In the depicted embodiment, the conductors 542 are spaced around the hollow tube and are not touching each other. In another embodiment, the conductors 542 are coated with an insulating material and can touch. In another embodiment, the conductors 542 touch each other and are not coated with an insulator. In another embodiment, the conductors 542 are made of piano wire. By having parallel conductors 542, a magnetic field formed in the core 236 will cause flux lines to fill the center of the core 236 and will be contained by the conductors 542 will very little eddy current loss or other loss.

The core 236 may be formed using a pipe of conductive material. In this embodiment, the conductors 542 are typically not present. The pipe is typically thin to reduce eddy current losses. Using a pipe is typically more lossy than a tube surrounded by conductors 542, but may be less labor intensive or less expensive than a hollow tube surrounded by conductors 542.

In one embodiment, the diameter of the conductors 542 or pipe is chosen to match the diameter 213 of the permanent magnets 218. This creates a flux pathway between the permanent magnets 218 where the flux travels more or less straight between the magnets 218. Rather than saturating an iron core, as in a traditional motor, and using the core as a permanent magnet to attract some magnetic material, the non-magnetic core 236 of the coils 220 of the present invention are used to focus magnetic fields. The small amount of conductive material around the core 236, a pipe, conductors 542, or the like, typically saturate easily. This conductive material surrounding the core 236 acts as a magnetic shield that will not easily allow magnetic flux lines to cross through the shield. The magnetic flux lines then travel through the core 236.

Strong magnets 218 create a saturated or near saturated magnetic field through a core 236 when a coil 220 coincides with a set of magnets 218. This causes a current limiting effect that keeps the current in the coils 220 at a minimum. As the ring gear 206 rotates, the magnetic field created by the coil 220 is altered by the magnetic flux between magnets 218. When a coil 220 is not directly aligned with a set of magnets 218, current in the coil 220 may increase. The faster the ring gears 206 rotate, the more current is allowed. The slower the ring gears 206 rotate, the more the saturated magnetic field affect current in the coils 220 so the lower the current.

In one embodiment, each coil 220 is of a uniform size with a non-conductive, non-magnetic core 236 and a thin conductive shield surrounding the core 236 and wherein a conductor 542 is wound around the shield. In another embodiment, the coils 220 are pre-formed so that if a coil 220 fails for any reason, a replacement coil 220 can be quickly produced with the same dimensions. The coils 220 are not custom wound on the stator 208, but instead are wound separately and are uniform. This is desirable because each coil 220 can be machine wound instead of wound by a semi-skilled laborer. This greatly reduces cost. In addition, because the coils 220 are a standard size, they are modular and a coil 220 can fit in any stator 208 opening for a coil 220.

The variable ratio transmission apparatus 200 has the desirable feature of a very low locked rotor current while maintaining a high amount of torque due to this current limiting effect. This feature significantly increases efficiency of the motor at slow speeds. As the variable ratio transmission apparatus 200 rotates, each time a coil 220 passes a set of magnets 218 and the current is reversed, the magnetic field collapses. Energy stored in the field in a typical motor is lost as heat. In the present invention, an energy recovery circuit is used to capture energy from a collapsing magnetic field.

In another embodiment, not all coils 220 are required for operation. For example, if a coil starts to fail, it can be shut off and flagged for replacement. The variable ratio transmission apparatus 200 will continue to operate with a slightly lower power output. In another example, certain coils 220 can be shut off to conserve energy or turned on to increase power. If a high torque is required, such as in a vehicle when accelerating from a stop, all of the coils 220 can be turned on to provide maximum power. Once the vehicle is up to speed and less power is required, some of the coils 220 can be shut off to conserve energy.

Figure 6:
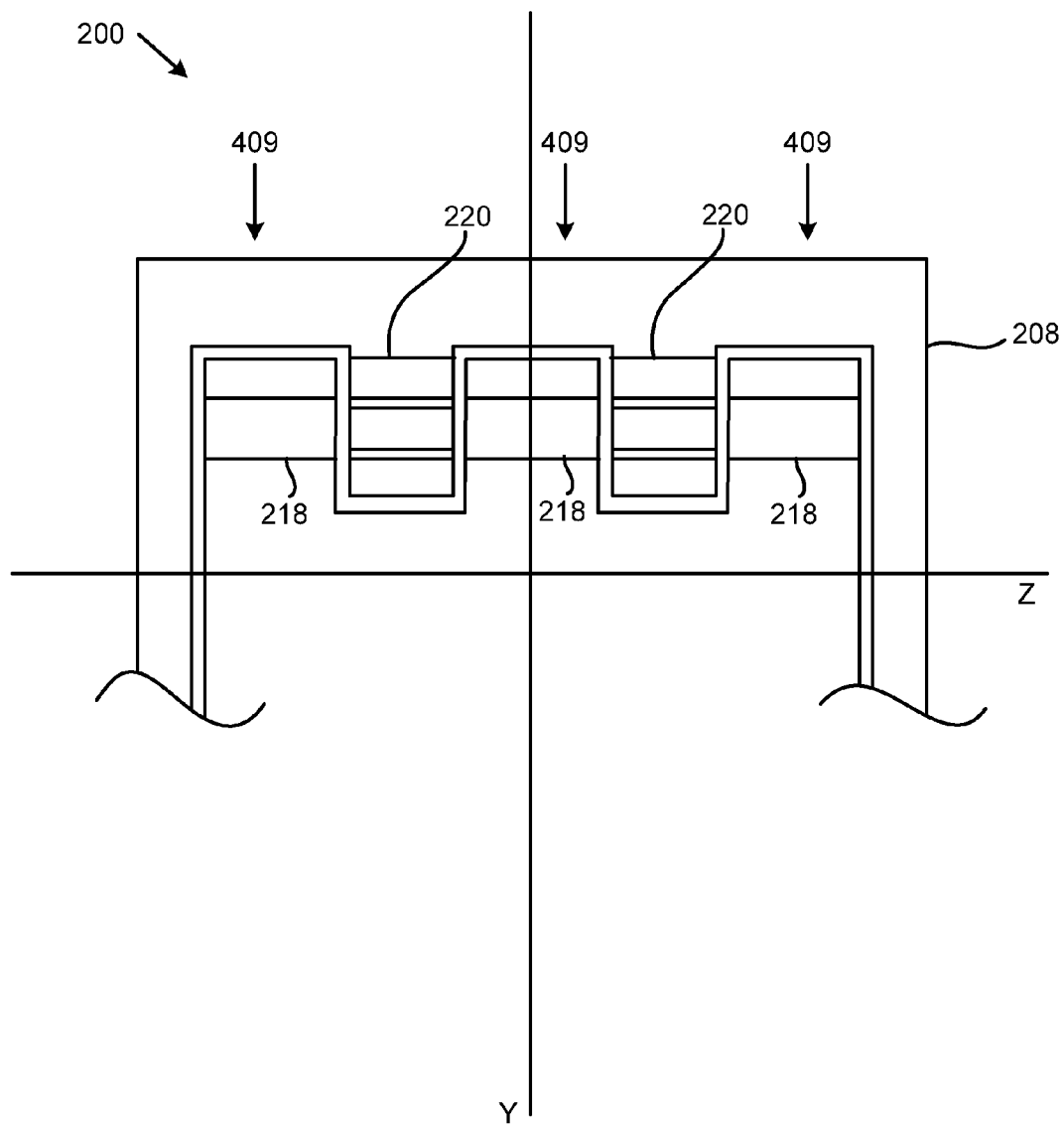
FIG. 6 is a cross sectional front view of the variable ratio transmission showing an embodiment containing three groups of permanent magnets and two groups of coils in accordance with the present invention.

FIG. 6 is a cross sectional front view of the variable ratio transmission apparatus 200 showing an embodiment containing three groups of permanent magnets 409 and two groups of coils 220 in accordance with the present invention. In the embodiment, the stator 208 contains two groups of co-planar coils 220. A group of co-planar coils 220 comprises a plurality of coils 220 in a two-dimensional plane. In the embodiment, the groups of co-planar coils 220 are co-planar coils 220 in a plane that is parallel with the x-y plane. One group of co-planar coils 220 is shown in FIGS. 2A and 2B. Each group of co-planar coils 220 is parallel to each other additional group of co-planar coils 220.

Each group of co-planar coils 220 is positioned between a pair of groups of co-planar permanent magnets 218. In the embodiment, the groups of co-planar permanent magnets 218 are shown. A group of co-planar permanent magnets 218 is a group of several permanent magnets 218 in a two-dimensional plane. In FIG. 6, a group of co-planar permanent magnets 218 is situated along the x-y plane. One group of co-planar permanent magnets 218 is shown in FIGS. 2A and 2B. The groups of co-planar permanent magnets 218 are parallel to each other and to the planes of the co-planar coils 220.

Figure 7:
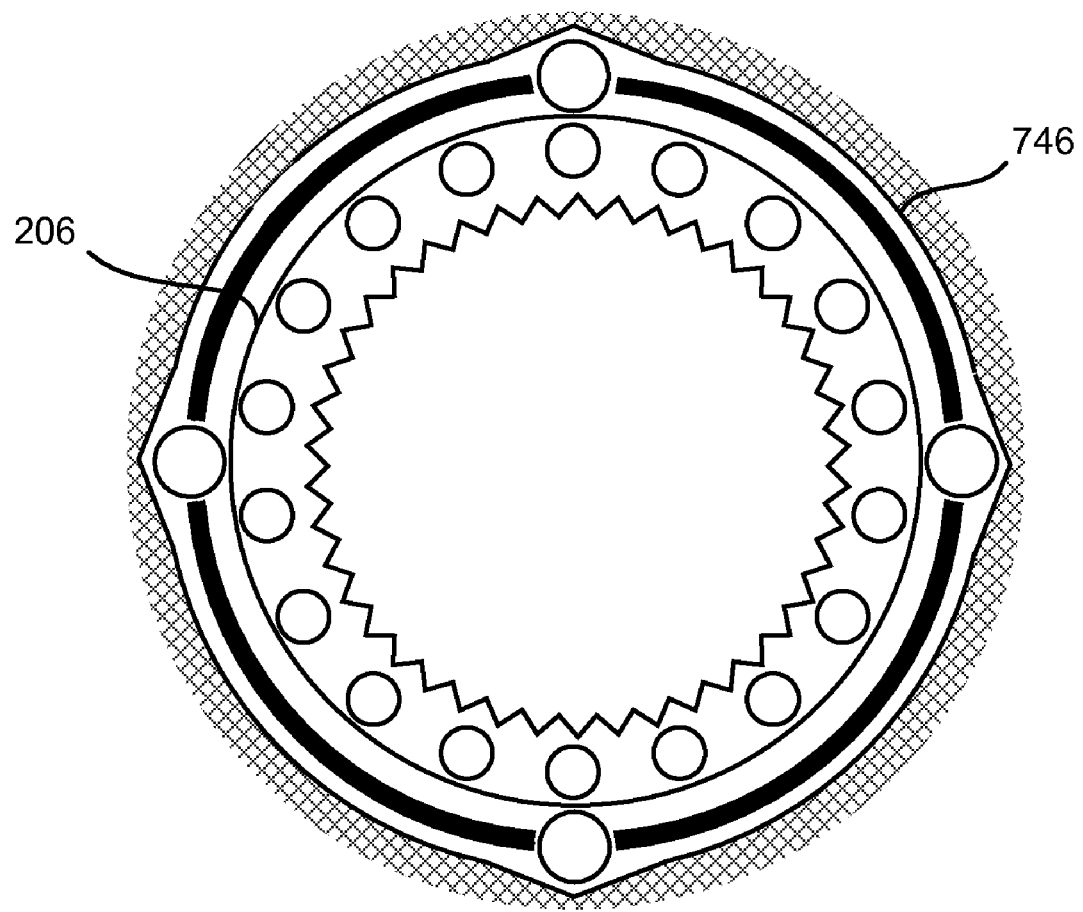
FIG. 7 is a side view of a ring gear containing a one-way clutch in accordance with the present invention.

FIG. 7 shows an embodiment in which the ring gear 206 is attached to a one-way clutch 746. The one-way clutch 746 allows the ring gear 206 to rotate in one direction but does not allow it to rotate in the opposite direction. The one way clutch prevents the ring gear 206 from reverse rotation during operation. The ring gear 206 may rotate idly in one direction but locks in place if the ring gear 206 begins to rotate in the opposite direction. The one-way clutch may be any one-way clutch of sufficient strength to prevent reverse rotation of the ring gear 206. In other embodiments, the clutch 746 may be a selectable one way clutch or a two way selectable one way clutch operably connected to the ring gear 206. The selectable one way clutch may be engaged or disengaged. The two way selectable one way clutch may be used as a forward or reverse clutch. One of skill in the art will recognize other one way clutches 746 that may be used in conjunction with the present invention.

Figure 8:
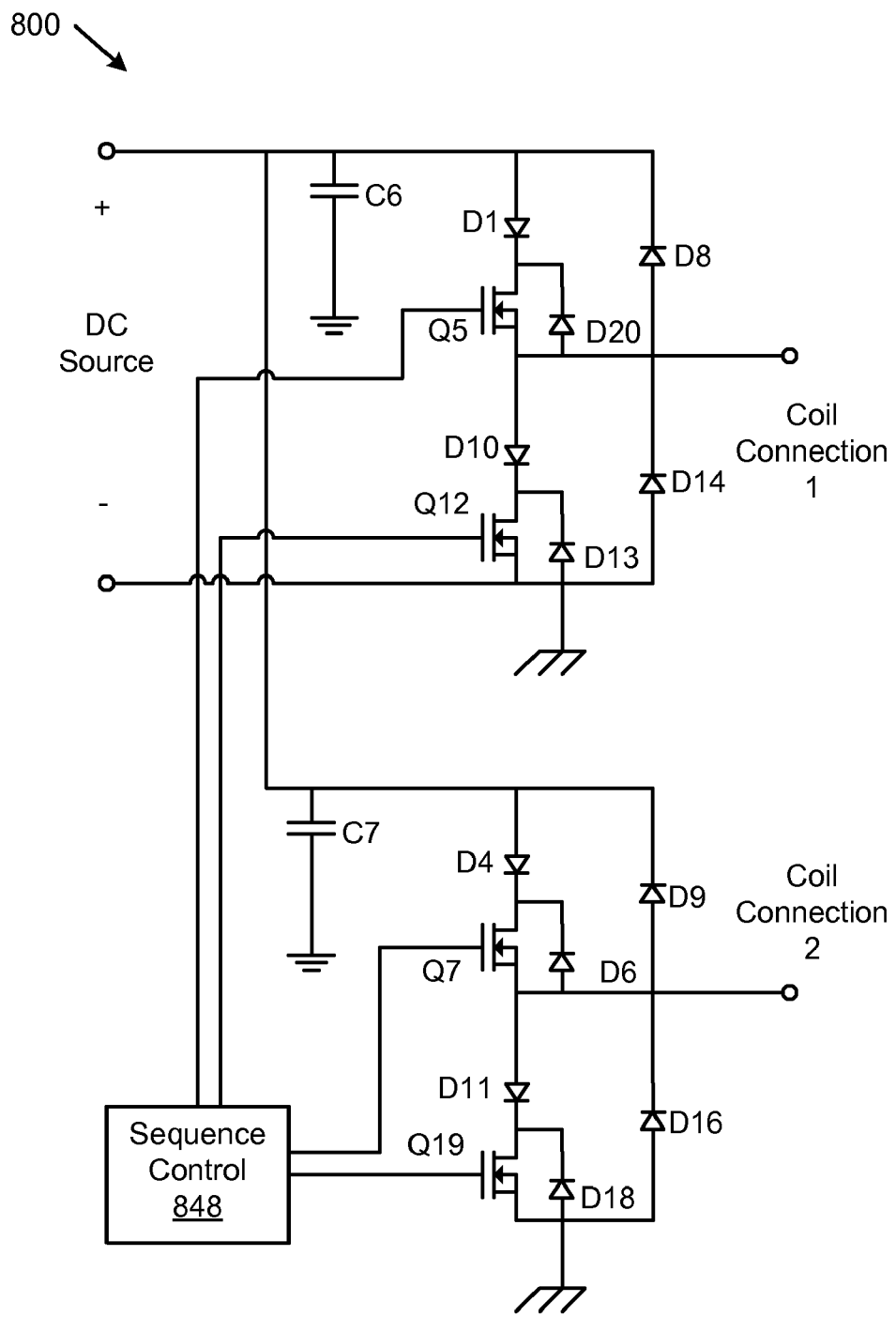
FIG. 8 is a depiction of one embodiment of an energy recovery circuit in accordance with the present invention.

FIG. 8 is a depiction of one embodiment of an energy recovery circuit 800 in accordance with the present invention. Component numbering is maintained between the detailed energy recovery circuit and FIG. 4 where possible. The sequence control 848 drives switches Q5, Q7, Q12 and Q19. When a coil 220 is in a position so it is ready to be connected, switches Q5 and Q19 close. This allows current from the direct current ("DC") source to flow through Q5 to the coil 220 and return from the coil 220 through Q19 to ground. When the ring gear 206 rotates to the point where the coil 220 is to be disconnected, switches Q5 and Q19 open. While the generated magnetic field in the coil 220 collapses, current continues to flow through the coil 220. The current flows through diodes D14 and D9 and charge up capacitor C7. Capacitor C7 is charged to a voltage higher than the DC source.

When the coil 220 is again connected, polarity is reversed so Q7 and Q12 are closed. This allows capacitor C7 to discharge through Q7 and Q12 to start current flowing in a direction opposite of the current flowing when Q5 and Q19 were closed. When the capacitor C7 discharges to the DC source voltage, the DC source begins to supply current. When the coil reaches the next set of magnets 218, Q7 and Q12 open. Current again continues to flow through the coil, which charges up capacitor C6.

This circuit 400 allows energy from a collapsing magnetic field, that would normally be lost as heat, to be recovered in capacitors C6 and C7 and then returned when the current is reversed in the coil 220. Testing has shown that when the variable ratio transmission apparatus 200 is moving slowly and current from the DC source is about 0.2 amperes ("A"), current flowing through the coil 220 may be about 6 A. The energy recovery circuit 800 typically increases motor efficiency significantly.

The sequence control 848 may also be used beneficially to increase the efficiency of the variable ratio transmission apparatus 200 by adjusting the timing of when each coil 220 is connected as a function of ring gear 206 speed. As the speed of the ring gear 206 increases, generation of magnetic fields in the coils 220 is affected. By altering the timing of when coils 220 are connected as a function of speed, the efficiency of the variable ratio transmission 200 is increased. Typically, as ring gear 206 speed increases, the timing is advanced so that current a coil 220 is reversed sooner than if the ring gear 206 is turning slowly. This timing advance is very similar to changing the timing of a gasoline or diesel engine.

In one embodiment, timing is adjusted in two or more steps. For example, up to a certain speed, the timing is such that the current reversal in a coil 220 occurs at top dead center (i.e. when a coil 220 aligns with a set of magnets 218) or at some angle before or after top dead center. When the ring gear speed reaches a certain level, the timing is advanced so that the current of a coil 220 is reversed ahead of reaching top dead center.

In another embodiment, the timing is adjusted continuously or substantially continuously as the ring gear 206 speed increases. This variable timing may be advantageous from an efficiency perspective. One of skill in the art will recognize other ways that the timing can be advanced to increase motor efficiency.

Figure 9:
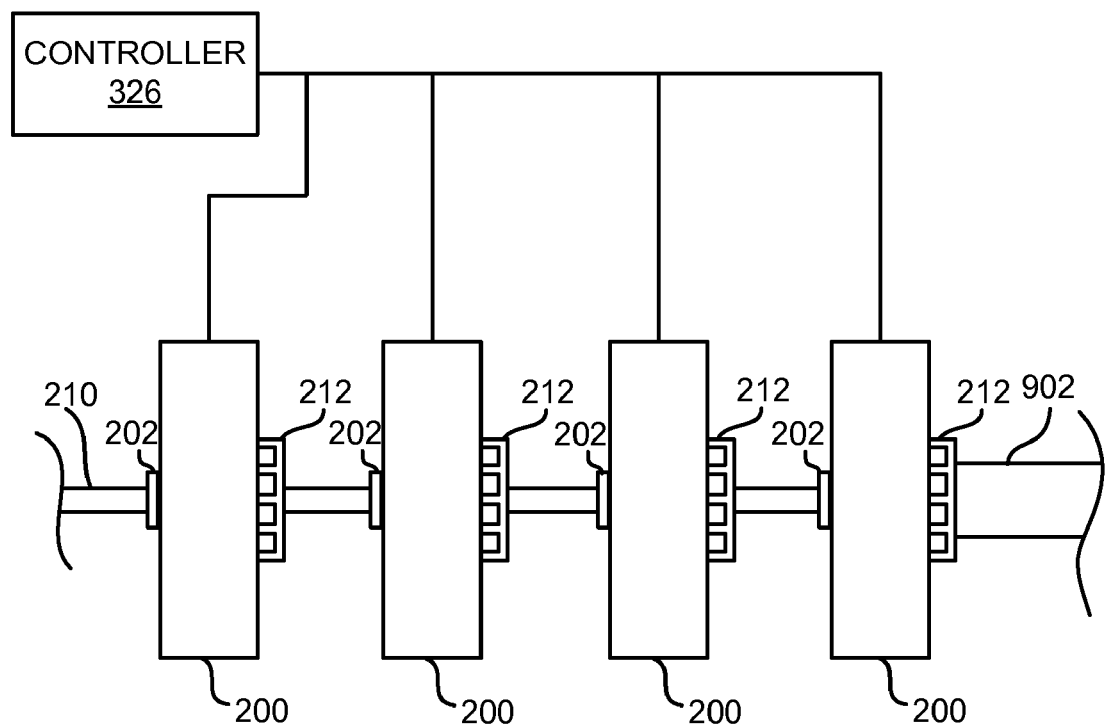
FIG. 9 is a front view of multiple planetary gear systems connected in sequence in accordance with the present invention.

In the embodiment of FIG. 9, four variable ratio transmission apparatuses 200 are connected in a series. In other embodiments, any number of variable ratio transmission apparatuses 200 may be connected in series. The first variable ratio transmission apparatus 200 includes said sun gear 202, said planet gears 204, said planet gear carrier 212, said ring gear 206 and said stator 208. Each additional variable ratio transmission apparatus 200 includes a sun gear 202, planet gears 204, a planet gear carrier 212, a ring gear 206 and a stator 208. The second input 216 to each additional variable ratio transmission apparatus 200 is made by electrically controlling the speed of each ring gear 206 using the associated stator 208. In this way, each additional variable ratio transmission apparatus 200 can further adjust the speed and torque of a final output 902.

The sun gear 202 of the first variable ratio transmission apparatus 200 is mechanically connected to and receives rotational energy from a first input 210. The sun gear 202 transfers the rotational energy to the planet gears 204. The ring gear 206 also transfers rotational energy to the planet gears 204. The planet gears 204 then transfer rotational energy to the planet gear carrier 212. The planet gear carrier 212 transfers the rotational energy to the output 214. Each planet gear carrier 212 of each variable ratio transmission apparatus 200 ahead of the final variable ratio transmission apparatus 200 transfers rotational energy to the sun gear 202 of the next variable ratio transmission apparatus 200. Each variable ratio transmission apparatus 200 is controlled separately by a controller 326. By adding additional variable ratio transmission apparatuses 200, the torque and speed ratios between the first input 210 and the final output 902 can be further adjusted.

Figure 10:
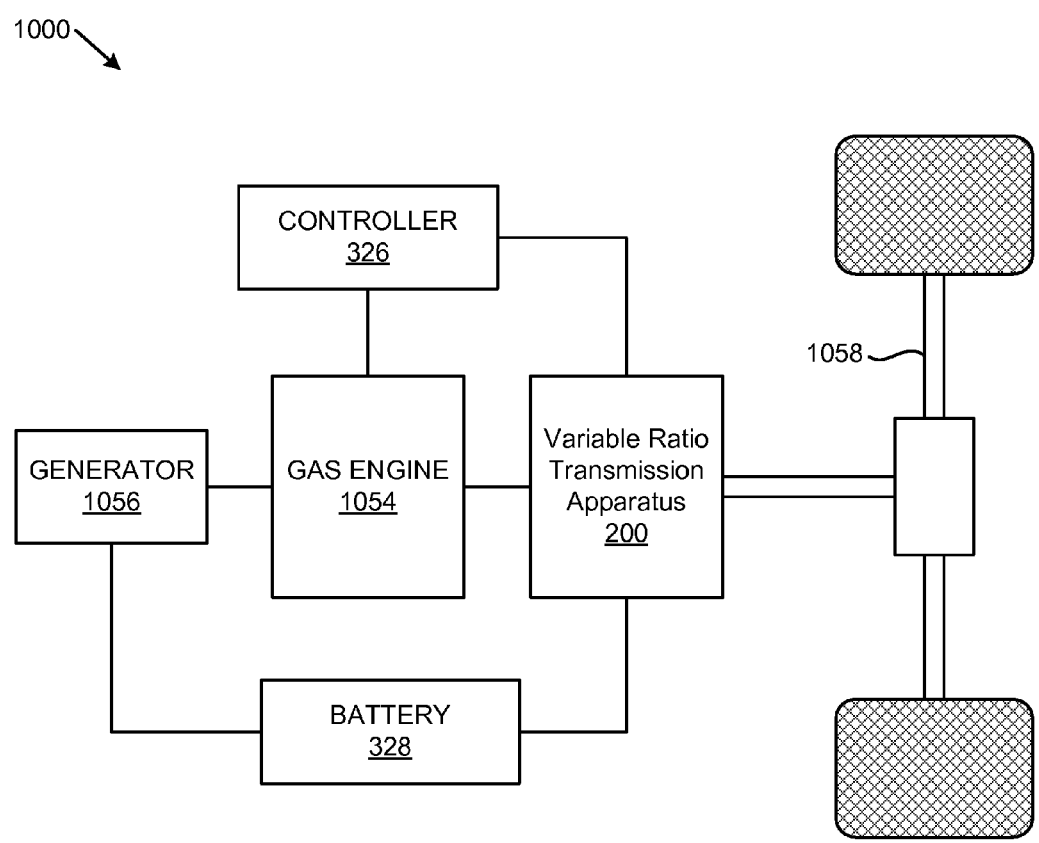
FIG. 10 is a block diagram illustrating one embodiment of a system where a gas engine provides the first input to the variable ratio transmission apparatus in accordance with the present invention.

FIG. 10 is a block diagram illustrating one embodiment of a system 1000 where a gas engine 1054 provides the first input 210 to the variable ratio transmission apparatus 200 in accordance with the present invention. The system 1000 includes a variable ratio transmission apparatus 200 containing a sun gear 202 that receives rotational force from a first input 210. The first input 210 is supplied by a gas engine 1054. The gas engine 1054 is mechanically linked to the sun gear 202 and the sun gear 202 receives rotational force from the gas engine 1054. The gas engine 1054 supplies rotational energy to a generator 1056 which charges a battery 328. The battery 328 supplies electrical energy to the stator 208. In one embodiment, the gas engine 1054 is directly linked to the sun gear 202. In another embodiment, the gas engine 1054 is indirectly linked to the sun gear 202 through a gearing system.

In the embodiment of FIG. 10, the output 214 of the variable ratio transmission apparatus 200 is connected with the propulsion system 1058 of a vehicle or other mechanical device. In one embodiment, the rotational force transferred from the planet gear carrier 212 is transferred directly to the propulsion system 1058 without the use any other gears. In one embodiment, the rotational force transferred from the planet gear carrier 212 is transferred through a separate gear system before being transferred to the propulsion system 1058. The planet gear carrier 212 may power a manufacturing line, a water craft, a pumping system, or any other mechanism that receives rotational force.

Figure 11:
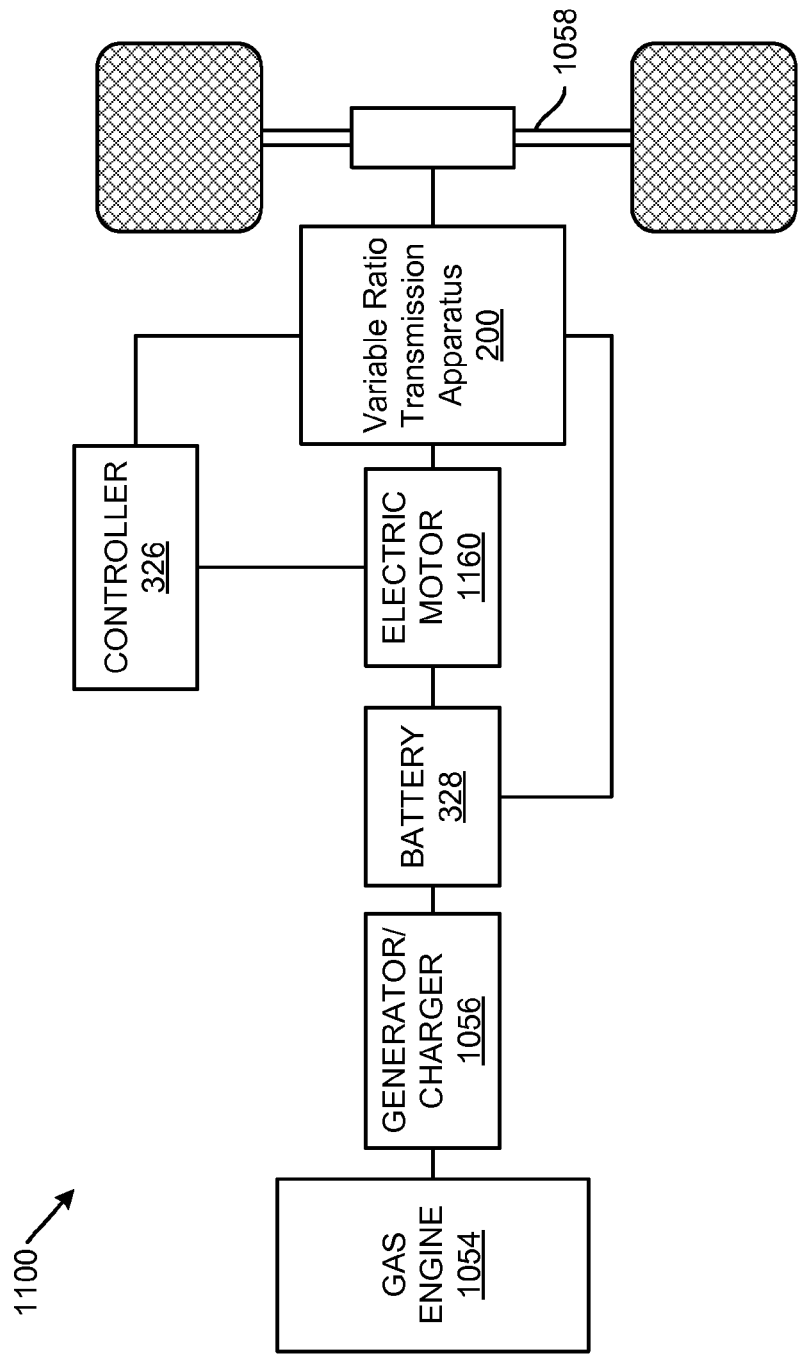
FIG. 11 is a block diagram illustrating one embodiment of a system where a second electric motor provides the first input to the variable ratio transmission in accordance with the present invention.

FIG. 11 is a block diagram illustrating one embodiment of a system 1100 where a second electric motor 1160 provides the first input 210 to the variable ratio transmission apparatus 200 in accordance with the present invention. The second electric motor 1160 is powered by a battery 328. The battery 328 is charged by a generator/charger 1056. A gas engine 1054 is used to power a generator 1056. The sun gear 202 of the variable ratio transmission apparatus 200 is mechanically linked to an output of the second electric motor 1160. The sun gear 202 receives rotational force from the output of the second electric motor 1160. In one embodiment, the output of the second electric motor 1160 is directly connected with the sun gear 202. In another embodiment, the second electric motor 1160 is connected with the sun gear 202 through a gear system.

The second electric motor 1160 also powers a controller 326 to electrically control the movement of the ring gear 206 through the stator 208. The battery 328 powers the stator 208.

The output 214 of the variable ratio transmission apparatus 200 powers a propulsion system 1058 of a vehicle for example. In other embodiments, the output 214 of the variable ratio transmission apparatus 200 can power a generator, a wheel, several wheels, a propeller, a manufacturing machine or any other mechanism that uses a rotational force as an input.

Figure 12:
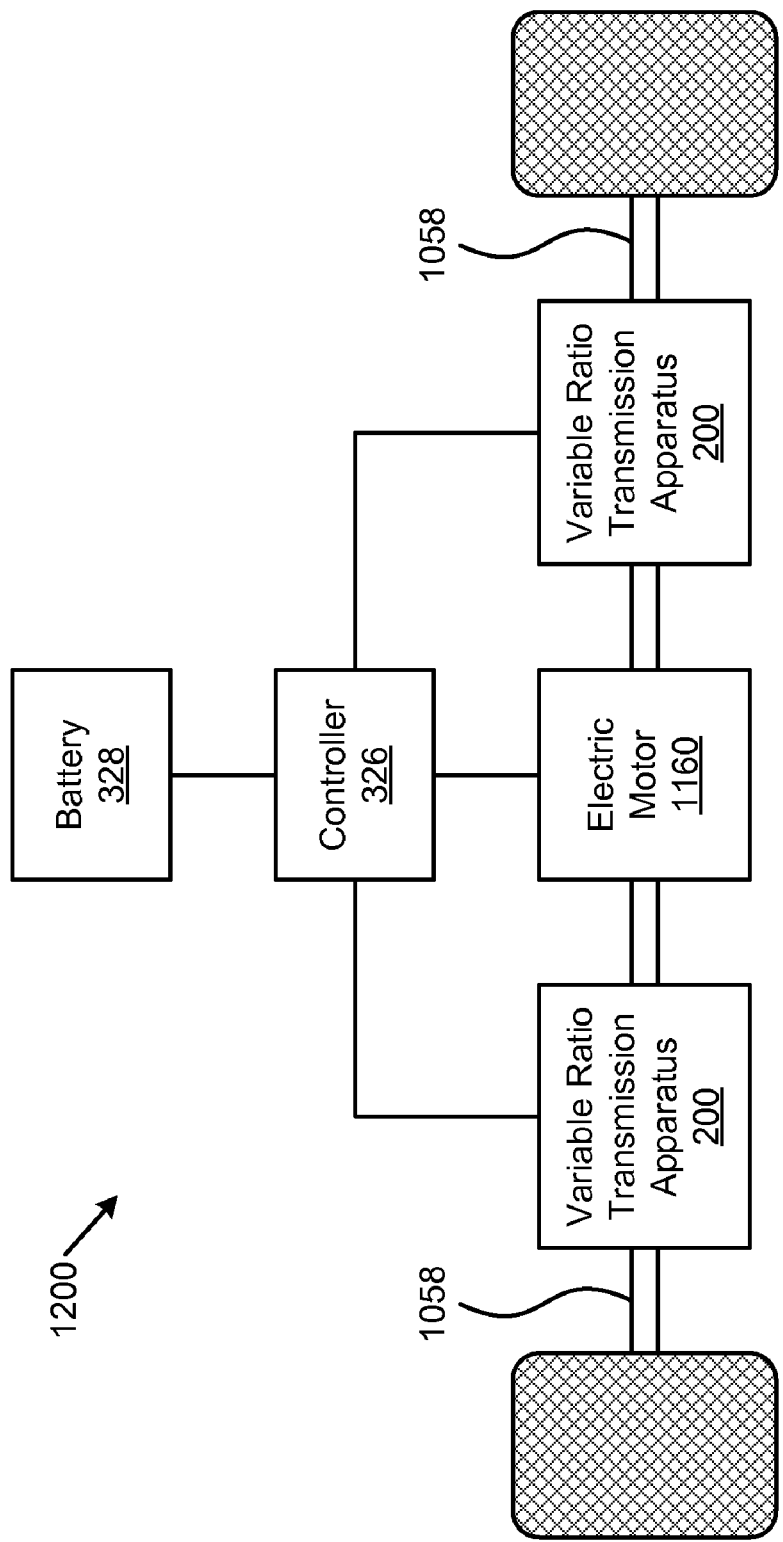
FIG. 12 is a block diagram illustrating one embodiment of a system with a motor driving two variable ratio transmissions in accordance with the present invention.

FIG. 12 is a block diagram illustrating one embodiment of a system 1200 with a motor driving two variable ratio transmission apparatuses 200 in accordance with the present invention. The system 1200 includes two variable ratio transmission apparatuses 200, an electric motor 1160, two propulsion systems 1058, a controller 326, and a battery 328, which are substantially similar to those described above. In the embodiment, the electric motor 1160 includes a shaft 1202 on both ends, each of which is connected to a sun gear 202 of one of the variable ratio transmission apparatuses 200. A planet gear carrier 212 of each of the variable ratio transmission apparatuses 200 drives a propulsion system 1058. In one example, a propulsion system 1058 is a drive shaft connected to a wheel of a vehicle. In this example, the variable ratio transmission apparatus 200 of the system 1200 may be used on a front-wheel drive vehicle and typically will weigh much less than the drive train of a typical front-wheel drive vehicle. One of skill in the art will recognize other applications of a motor 1160 with two shafts driving two variable ratio transmission apparatuses 200.

The system 1200 includes a controller 326 that controls power to the electric motor 1160 and to the stators 208 of the variable ratio transmission apparatuses 200. In one embodiment, power is supplied to the stators 208 and electric motor from a battery 328. The battery 328 may be charged by a gas engine 1054 and generator/charger 1056 as described above, directly from a generator 1056, from a utility power source, or some other electrical supply. One of skill in the art will recognize other ways to provide and control power to the electric motor 1160 and stators 208. In one embodiment, the stators 208 are driven such that the propulsion systems 1058 rotate at the same speed. In another embodiment, the stators 208 are driven such that each propulsion system 1058 rotates at a different speed. In another embodiment, the stators 208 are driven to maintain a certain torque to the propulsion systems 1058. One of skill in the art will recognize other ways to control one or more stators 208 in each variable ratio transmission apparatus 200.

In another embodiment, a fossil fuel engine, such as a gas engine 1054, is used in place of the variable ratio transmission apparatuses 200. In this embodiment, the controller 326 may control only stators 208 in the variable ratio transmission apparatuses 200 or may also control to fossil fuel engine. In a further embodiment, the fossil fuel engine is connected directly to the variable ratio transmission apparatuses 200. In an alternate embodiment, the fossil fuel engine is connected to the variable ratio transmission apparatuses 200 indirectly through gearing or other means. One of skill in the art will recognize other ways to simultaneously drive two variable ratio transmission apparatuses 200 as depicted in FIG. 12.

Figure 13:
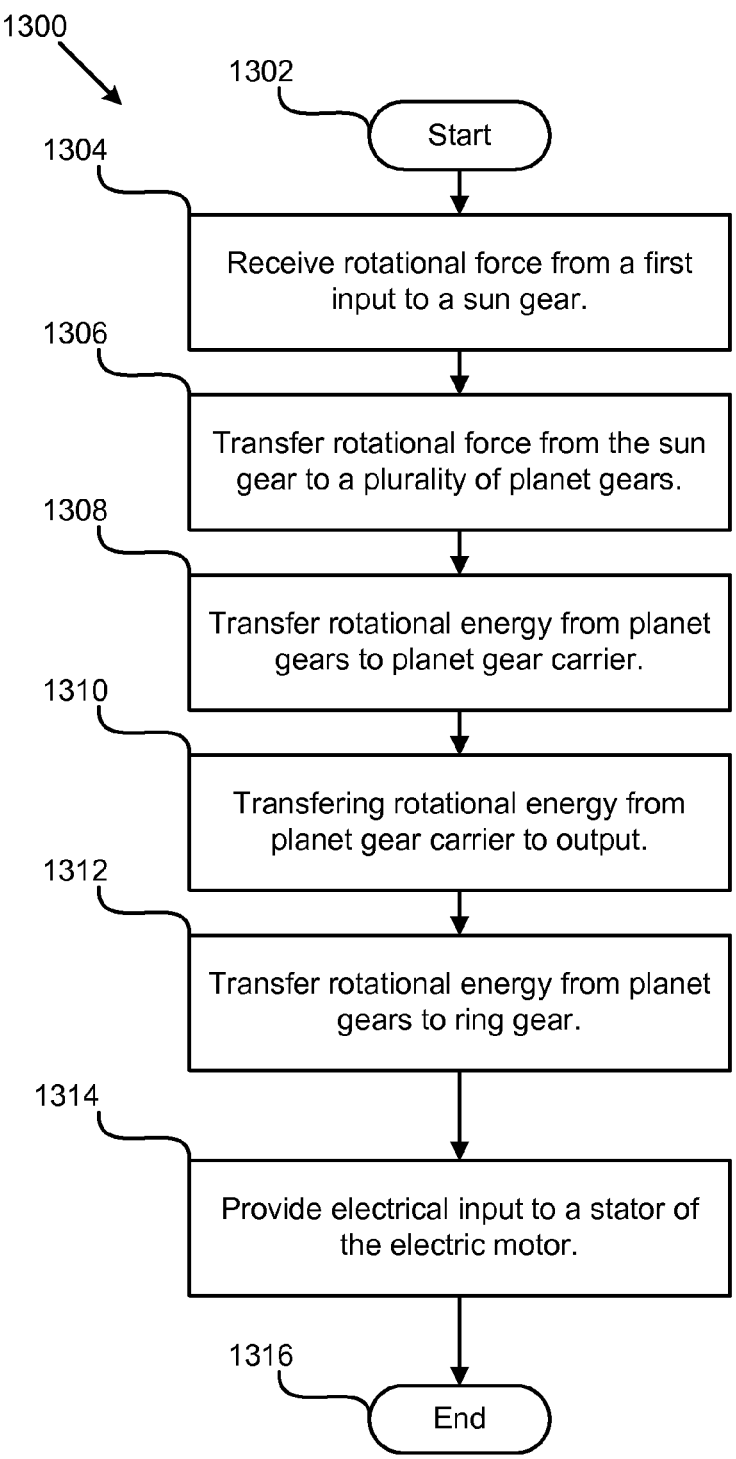
FIG. 13 is a schematic flow chart diagram illustrating one embodiment of a method for adjusting rotational input to output ratios with a planetary gear system.

FIG. 13 is a schematic flow chart diagram illustrating one embodiment of a method 1300 for adjusting rotational input to output ratios with a planetary gear system. The method 1300 starts 1302 and the sun gear 202 receives 1304 rotational force from a first input 210. The first input 210 may be provided by an electric motor, a fossil fuel engine or any other device that can provide a rotational force. The sun gear 202 then transfers 1306 rotational force from the sun gear 202 to the plurality of planet gears 204. The plurality of planet gears 204 encircles the sun gear 202 and operably connects with the sun gear 202.

The plurality of planet gears 204 transfer 1308 rotational energy to a planet gear carrier 212. The planet gears 204 are connected with the planet gear carrier 212. The planet gear carrier 212 transfers 1310 rotational energy to an output 214. The planet gears 204 transfer 1312 rotational energy to the ring gear 206. The ring gear 206 encircles the planet gears 204 and is operably connected to each of the planet gears 204. The rotational motion of the ring gear 206 comprises a second input 216. The second input 216 controls speed and torque ratios between the first input 210 and the output 214. The ring gear 206 contains a plurality of permanent magnets 218.

The method 1300 provides 1314 electrical input to a stator 208 of the electric motor comprising the ring gear 206 and the stator 208 and the method 1300 ends. The stator 208 contains a plurality of coils 220 aligned with the permanent magnets 218 of the ring gear 206. Each coil 220 is positioned between pairs of permanent magnets 218 of the ring gear 206. The stator 208 is fixed with respect to the ring gear 206. Electrically controlling the speed of the ring gear 206 using the electrical input to the stator 208 comprises the second input 216.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to adjust rotational input to output ratios with a planetary gear system, the apparatus comprising:
    a sun gear that receives a rotational force from a first input;
    a plurality of planet gears that encircle the sun gear and operably connect with the sun gear, wherein the sun gear transfers rotational force to the plurality of planet gears;
    a planet gear carrier connected to the plurality of planet gears, wherein the plurality of planet gears transfer rotational energy to the planet gear carrier and wherein the planet gear carrier transfers rotational force to an output;
    a ring gear encircling the planet gears and operably connected to each of the planet gears, the ring gear comprising a rotor of an electric motor, rotational motion of the ring gear comprising a second input, the second input controlling speed and torque ratios between the first input and the output, the ring gear comprising a plurality of permanent magnets;
    a stator of the electric motor comprising a plurality of coils aligned with the permanent magnets of the ring gear wherein each coil is of a uniform size with a non-conductive, non-magnetic core and a thin conductive shield surrounding the core and wherein a conductor is wound around the shield, and wherein each coil is positioned between pairs of permanent magnets of the ring gear, the coils of a row of coils each positioned a same radius from the center of the sun gear, and the permanent magnets of a corresponding row of permanent magnets each positioned a substantially similar radius from the center of the sun gear such that the center of the permanent magnets substantially aligns with the center of the corresponding coils, wherein the stator comprises a fixed position with respect to the ring gear, wherein electrically controlling the speed of the ring gear using the stator comprises the second input.

2. The apparatus of claim 1, wherein the stator comprises a non-magnetic, non-conductive material wherein the coils are embedded within the non-magnetic, non-conductive material.

3. The apparatus of claim 1, wherein at least a portion of the ring gear surrounding the permanent magnets comprises a non-metallic, non-conductive material.

4. The apparatus of claim 1, wherein the permanent magnets are positioned such that when a coil aligns with a permanent magnet a next coil aligns between two magnets.

5. The apparatus of claim 1, wherein the radius of the core of the coils is substantially the same as the radius of the permanent magnets.

6. The apparatus of claim 1, wherein each coil is wound such that the conductor enters the coil at the exterior of windings of the coil and exits at the exterior of the coil without the conductor passing the windings of the coil perpendicular to the windings.

7. The apparatus of claim 1, wherein each coil is constructed of two halves wherein each half is wound such that the conductor starts at an interior of the coil and is wound with increasing radius such that the end of the conductor exits at the perimeter of the coil and wherein each half of the coil is joined such that the start of each conductor located at the interior of the winding are electrically connected together.

8. The apparatus of claim 1, wherein the permanent magnets are shaped as cylinders with an end of the cylindrical permanent magnet positioned toward the stator.

9. The apparatus of claim 1, wherein the torque and speed of the planet gear carrier are proportionally related to each other such that a decrease in speed corresponds to an increase in torque.

10. The apparatus of claim 1, wherein the stator comprises a plurality of groups of co-planar coils, a group of co-planar coils comprises a plurality of coils in a two-dimensional plane and each group of co-planar coils is parallel to one or more additional groups of co-planar coils, each group of co-planar coils is positioned between a pair of groups of co-planar permanent magnets, a group of co-planar permanent magnets comprises a plurality of permanent magnets in a two-dimensional plane and the groups of co-planar permanent magnets are parallel to each other and to the planes of the co-planer coils.

11. The apparatus of claim 1, wherein teeth of the sun, planet, planet carrier and ring gears and the electric motor remain constantly engaged.

12. The apparatus of claim 1, wherein the stator is fixed and surrounds the outside perimeter of the ring gear.

13. The apparatus of claim 1, further comprising a one-way clutch operably connected with the ring gear, wherein the one-way clutch allows the ring gear to rotate in one direction.

14. The apparatus of claim 1, further comprising two shunt rings, each shunt ring comprising a magnetically conductive material and connecting an exterior edge of each permanent magnet that is not facing a stator.

15. The apparatus of claim 1, further comprising a sequence control that connects each coil such that current flows in a coil in one direction and the sequence control disconnects the coil and reconnects the coil with current flowing in the opposite direction in response to a set of permanent magnets aligning directly with the coil.

16. The apparatus of claim 1, further comprising one or more additional planetary gear systems connected in series in a sequence, a first planetary gear system comprising said sun gear, said plurality of planet gears, said planet gear carrier, said ring gear and said stator, each additional planetary gear system comprising a sun gear, planet gears, a planet gear carrier, a ring gear and a stator, wherein electrically controlling the speed of each ring gear using each associated stator comprises a second input to each additional planetary gear system, the sun gear of the first planetary gear system receiving a first input, the planet gear carrier transferring rotational energy to the output, each planet gear carrier of each planetary gear system ahead of a final planetary gear system transferring rotational energy to the sun gear of a next planetary gear system.

17. The apparatus of claim 1, wherein the thin conductive shield comprises a plurality of conductors, wherein each of the plurality of conductors are insulated from the other plurality of conductors and the conductors wound around the shield.

18. The apparatus of claim 17, wherein each of the plurality of conductors comprises a thin conductor running the length of the coil, each of the plurality of conductors substantially parallel to an axis of the coil.

19. A system to adjust rotational input to output ratios with a planetary gear system, the system comprising:
a sun gear that receives a rotational force from a first input;
a plurality of planet gears that encircle the sun gear and operably connect with the sun gear, wherein the sun gear transfers rotational force to the plurality of planet gears;
a planet gear carrier connected to the plurality of planet gears, wherein the plurality of planet gears transfer rotational energy to the planet gear carrier and wherein the planet gear carrier transfers rotational force to an output;
a ring gear encircling the planet gears and operably connected to each of the planet gears, the ring gear comprising a rotor of an electric motor, rotational motion of the ring gear comprising a second input, the second input controlling speed and torque ratios between the first input and the output, the ring gear comprising a plurality of permanent magnets;
a stator of the electric motor comprising a plurality of coils aligned with the permanent magnets of the ring gear wherein each coil is of a uniform size with a non-conductive, non-magnetic core and a thin conductive shield surrounding the core and wherein a conductor is wound around the shield, and wherein each coil is positioned between pairs of permanent magnets of the ring gear, the coils of a row of coils each positioned a same radius from the center of the sun gear, and the permanent magnets of a corresponding row of permanent magnets each positioned a substantially similar radius from the center of the sun gear such that the center of the permanent magnets substantially aligns with the center of the corresponding coils, wherein the stator comprises a fixed position with respect to the ring gear, wherein electrically controlling the speed of the ring gear using the stator comprises the second input.

20. The system of claim 19, wherein the first input comprises rotational force from a fossil fuel engine, the sun gear being mechanically linked to the fossil fuel engine, the sun gear receiving rotational force from the fossil fuel engine.

21. The system of claim 19, wherein the first input comprises a rotational force from a second electric motor, the sun gear being mechanically linked to an output of the second electric motor, the sun gear receiving rotational force from the output of the second electric motor.

22. The system of claim 21, wherein the second electric motor is powered by a battery, and wherein the battery is charged by a fossil fuel engine.

23. The system of claim 21, wherein the output of the second electric motor is directly connected with the sun gear.

24. The system of claim 19, wherein the first input is connected to a system of gears before being mechanically connected to the sun gear.

25. The system of claim 19, wherein the output comprises a propulsion system for a vehicle.

26. A method to adjust rotational input to output ratios with a planetary gear system, the method comprising:
receiving rotational force from a first input to a sun gear;
transferring rotational force from the sun gear to a plurality of planet gears, the plurality of planet gears encircling the sun gear and operably connecting with the sun gear;
transferring rotational energy from the plurality of planet gears to a planet gear carrier, the planet gear carrier being connected to the plurality of planet gears, transferring rotational energy from the planet gear carrier to an output;
transferring rotational energy from each of the planet gears to a ring gear, the ring gear encircling the planet gears and operably connecting to each of the planet gears, the ring gear comprising a rotor of an electric motor, rotational motion of the ring gear comprising a second input, the second input controlling speed and torque ratios between the first input and the output, the ring gear comprising a plurality of permanent magnets;
providing an electrical input to a stator of the electric motor, the stator comprising a plurality of coils aligned with the permanent magnets of the ring gear wherein each coil is of a uniform size with a non-conductive, non-magnetic core and a thin conductive shield surrounding the core and wherein a conductor is wound around the shield, and wherein each coil is positioned between pairs of permanent magnets of the ring gear, the coils of a row of coils each positioned a same radius from the center of the sun gear, and the permanent magnets of a corresponding row of permanent magnets each positioned a substantially similar radius from the center of the sun gear such that the center of the permanent magnets substantially aligns with the center of the corresponding coils, wherein the stator comprises a fixed position with respect to the ring gear, wherein electrically controlling the speed of the ring gear using the electrical input to the stator comprises the second input.

27. An apparatus to adjust rotational input to output ratios with a planetary gear system, the apparatus comprising:
a sun gear that receives a rotational force from a first input;
a plurality of planet gears that encircle the sun gear and operably connect with the sun gear, wherein the sun gear transfers rotational force to the plurality of planet gears;
a planet gear carrier connected to the plurality of planet gears, wherein the plurality of planet gears transfer rotational energy to the planet gear carrier and wherein the planet gear carrier transfers rotational force to an output;
a ring gear encircling the planet gears and operably connected to each of the planet gears, the ring gear comprising a rotor of an electric motor, rotational motion of the ring gear comprising a second input, the second input controlling speed and torque ratios between the first input and the output, the ring gear comprising a plurality of permanent magnets wherein at least a portion of the ring gear surrounding the permanent magnets comprises a non-metallic, non-conductive material;
a stator of the electric motor comprising a plurality of coils aligned with the permanent magnets of the ring gear wherein each coil is of a uniform size with a non-conductive, non-magnetic core and a thin conductive shield surrounding the core and wherein a conductor is wound around the shield, and wherein each coil is positioned between pairs of permanent magnets of the ring gear, wherein the stator comprises a non-magnetic, non-conductive material, the coils embedded within the non-magnetic, non-conductive material, the coils of a row of coils each positioned a same radius from the center of the sun gear, and the permanent magnets of a corresponding row of permanent magnets each positioned a substantially similar radius from the center of the sun gear such that the center of the permanent magnets substantially aligns with the center of the corresponding coils, the stator comprising a fixed position with respect to the ring gear, wherein electrically controlling the speed of the ring gear using the stator comprises the second input.

* * * * *